(12) United States Patent
Müller et al.

(10) Patent No.: US 10,836,521 B2
(45) Date of Patent: Nov. 17, 2020

(54) FLOW WRAPPER WITH LEAKAGE-CONTROL OF THE RESULTING PACKAGES

(71) Applicant: GEA Food Solutions Weert B.V., RV Weert (NL)

(72) Inventors: Sven Müller, Biedenkopf (DE); Andreas Steffen, Hatzfeld-Holzhausen (DE)

(73) Assignee: GEA FOOD SOLUTIONS WEERT B.V., Weert (NL)

( * ) Notice: Subject to any disclaimer, the term of this patent is extended or adjusted under 35 U.S.C. 154(b) by 171 days.

(21) Appl. No.: 16/070,377

(22) PCT Filed: Jan. 17, 2017

(86) PCT No.: PCT/EP2017/050882
§ 371 (c)(1),
(2) Date: Jul. 16, 2018

(87) PCT Pub. No.: WO2017/125386
PCT Pub. Date: Jul. 27, 2017

(65) Prior Publication Data
US 2019/0023432 A1    Jan. 24, 2019

(30) Foreign Application Priority Data

Jan. 20, 2016  (DE) .................. 10 2016 200 749
Mar. 9, 2016   (DE) .................. 10 2016 203 876
(Continued)

(51) Int. Cl.
*B65B 9/04*   (2006.01)
*B65B 9/20*   (2012.01)
(Continued)

(52) U.S. Cl.
CPC ............ *B65B 25/001* (2013.01); *B65B 9/04* (2013.01); *B65B 9/20* (2013.01); *B65B 31/021* (2013.01);
(Continued)

(58) Field of Classification Search
CPC . B29C 65/00–18; B65B 25/00; B65B 25/001; B65B 9/00; B65B 9/04;
(Continued)

(56) References Cited

U.S. PATENT DOCUMENTS 3,091,114 A  5/1963 Webster
3,592,049 A  7/1971 Johanski, Jr.
(Continued)

FOREIGN PATENT DOCUMENTS

DE       19524050 A1 *  1/1997  .......... G01M 3/3272
DE    102006012038 A1     9/2007
(Continued)

OTHER PUBLICATIONS

International Search Report and Written Opinion for International Application No. PCT/EP2017/050882, dated Jul. 24, 2017.
(Continued)

*Primary Examiner* — Nguyen Q. Ha
(74) *Attorney, Agent, or Firm* — The Dobrusin Law Firm, P.C.

(57) ABSTRACT

The present invention relates to a flow wrapper which comprises a form and/or film tube, which forms the planar film into a film tube and/or fills the film tube with a packaging item and which comprises means to provide a longitudinal- and/or cross-seal to the film tube.

20 Claims, 3 Drawing Sheets

(30) Foreign Application Priority Data

| | | |
|---|---|---|
| Mar. 11, 2016 | (DE) | 10 2016 204 085 |
| May 17, 2016 | (DE) | 10 2016 208 441 |
| May 27, 2016 | (DE) | 10 2016 209 207 |
| Jun. 20, 2016 | (EP) | 16175264 |
| Jul. 11, 2016 | (DE) | 10 2016 212 574 |
| Jul. 15, 2016 | (DE) | 10 2016 213 009 |
| Jul. 15, 2016 | (DE) | 10 2016 213 010 |

(51) Int. Cl.
```
B65B 31/06      (2006.01)
B65B 25/00      (2006.01)
B65B 31/02      (2006.01)
B65B 31/04      (2006.01)
B65B 61/02      (2006.01)
B65B 61/20      (2006.01)
G01M 3/22       (2006.01)
G01M 3/32       (2006.01)
G01M 3/40       (2006.01)
G01N 31/22      (2006.01)
G01N 21/77      (2006.01)
G01N 21/90      (2006.01)
G01N 21/78      (2006.01)
```

(52) U.S. Cl.
CPC .......... *B65B 31/045* (2013.01); *B65B 61/025* (2013.01); *B65B 61/20* (2013.01); *G01M 3/229* (2013.01); *G01M 3/3272* (2013.01); *G01M 3/3281* (2013.01); *G01M 3/40* (2013.01); *G01N 21/7703* (2013.01); *G01N 21/90* (2013.01); *G01N 21/9054* (2013.01); *G01N 31/223* (2013.01); *G01N 31/225* (2013.01); *G01N 21/783* (2013.01); *G01N 2021/7786* (2013.01)

(58) Field of Classification Search
CPC ... B65B 9/20; B65B 31/02–06; B65B 31/021; B65B 31/045; B65B 61/02; B65B 61/025; B65B 61/20; G01M 3/229; G01M 3/32; G01M 3/3272; G01M 3/3281; G01M 3/38; G01M 3/40; G01N 21/77; G01N 21/7703; G01N 21/78; G01N 21/783; G01N 21/90; G01N 21/9054; G01N 31/22; G01N 31/223; G01N 31/225; G01N 2021/7786
See application file for complete search history.

(56) References Cited

U.S. PATENT DOCUMENTS

| | | | |
|---|---|---|---|
| 3,744,210 A | | 7/1973 | O'Lenick et al. |
| 5,226,316 A | | 7/1993 | Mally et al. |
| 5,365,774 A | | 11/1994 | Horlacher |
| 6,279,384 B1 | * | 8/2001 | Heikkinen ............ G01M 3/229 |
| | | | 73/40.7 |
| 7,534,615 B2 | * | 5/2009 | Havens .................. B32B 27/08 |
| | | | 436/127 |
| 8,397,475 B2 | | 3/2013 | Boekstegers et al. |
| 8,707,766 B2 | * | 4/2014 | Harris .................. G01N 31/225 |
| | | | 73/49.3 |
| 9,046,437 B2 | * | 6/2015 | Miller ..................... G01M 3/04 |
| 10,065,752 B2 | * | 9/2018 | Steffens ................... B65B 1/26 |
| 2002/0046548 A1 | | 4/2002 | Forman |
| 2003/0199095 A1 | * | 10/2003 | Yuyama ............... G01N 31/223 |
| | | | 436/1 |
| 2007/0212789 A1 | | 9/2007 | Havens et al. |
| 2007/0212792 A1 | | 9/2007 | Havens et al. |
| 2011/0244577 A1 | | 10/2011 | Shimoda et al. |
| 2012/0279180 A1 | | 11/2012 | Crawford et al. |
| 2014/0287521 A1 | | 9/2014 | Bender |
| 2015/0316441 A1 | * | 11/2015 | Subhash ............... G01L 5/0052 |
| | | | 73/49.3 |

FOREIGN PATENT DOCUMENTS

| | | | | |
|---|---|---|---|---|
| DE | 102014202596 A1 | | 8/2015 | |
| EP | 0277458 A1 | | 8/1988 | |
| EP | 0449798 A2 | | 10/1991 | |
| EP | 0586894 A2 | | 3/1994 | |
| EP | 1273898 A2 | | 1/2003 | |
| EP | 2256042 B1 | | 12/2010 | |
| EP | 2525221 A1 | | 11/2012 | |
| EP | 2778078 A1 | | 9/2014 | |
| GB | 2054453 A | * | 2/1981 | ............... B65B 9/12 |
| GB | 2524159 A | | 9/2015 | |
| WO | 9838112 A1 | | 9/1998 | |
| WO | 2010/053888 A1 | | 5/2010 | |
| WO | 2011/012730 A2 | | 2/2011 | |
| WO | 2011/091811 A1 | | 8/2011 | |

OTHER PUBLICATIONS

Partial Search Report for International Application No. PCT/EP2017/050882, dated May 23, 2017.

International Preliminary Report on Patentability for International Application No. PCT/EP2017/050882, dated May 4, 2018.

* cited by examiner

FLOW WRAPPER WITH LEAKAGE-CONTROL OF THE RESULTING PACKAGES

The present invention relates to a flow wrapper which comprises a form and/or film tube, which forms the planar film into a film tube and/or fills the film tube with a packaging item and which comprises means to provide a longitudinal- and/or cross-seal to the film tube.

These flow wrappers are known from the state in the art and are utilized to package items, especially food items. In some cases, the gas-atmosphere in the package is modified, i.e. the gas-atmosphere in the package is different in comparison to air and/or the pressure in the package is below ambient pressure. In some cases, the longitudinal and/or the cross seal are not hermetically tight, so that the gas atmosphere and/or the pressure in the package changes over time, which may influence the quality of the packaged item and/or its shelf-life of the package.

It was therefore the objective of the present invention, to provide a flow wrapper, which does not comprise the deficiencies according to the state of the art.

This objective is attained by a flow wrapper which comprises a form- and/or film tube, which forms the planar film into a film tube and/or fills the film tube with a packaging item and which comprises means to provide a longitudinal- and/or cross-seal to the film tube, wherein it comprises means to detect leaks at the seal.

The disclosure made regarding this embodiment of the present invention also applies to the other embodiments of the present invention and vice versa. Subject matters of this embodiment can be combined with other embodiments and vice versa.

The present invention relates to a packaging machine, which forms a planar film web into a film tube, which is transported, continuously or intermittently, preferably along a filling tube. The filling tube is preferably provided vertically. Two opposing ends of this film tube are sealed together by a longitudinal sealing means, which is the so called longitudinal seal. Subsequently, the packaging item is filled into the film tube and a cross-seal is applied to the film tube to close the package. Simultaneously or after applying the cross-seal, the finalized packages are cut off the film tube.

Preferably, the gas atmosphere in package is modified, i.e. different from air. Preferably, the gas atmosphere is enriched with $N_2$ and/or $CO_2$.

According to the present invention, the flow wrapper comprises means to change the internal pressure of the package after its production, i.e after the last cross seal has been applied and/or after the package has been cut off. This can be done by increasing and/or decreasing the pressure in the package. In case one of the seals is not perfectly tight the shape and/or the composition of the gas atmosphere in the package will change, which can be detected by an appropriate sensor. During the pressure change, the atmosphere outside of the package is preferably different from the atmosphere inside the package. The means to change the pressure in the package can be rolls and/or plates through which the package passes and which pressurize the package and/or a labler that applies a lable to the package. The means can also be a pressure chamber which, in case there is an untight seal, presses a gas into the package. In case there is a modified atmosphere in the package and/or in case there is a reduced pressure in the package, this gas is preferably air. In case air is in the package, the gas in the chamber is preferably different from air. The pressure in the chamber can be increased and/or decreased while the package is in the chamber. An alternation of the pressure results in a "breathing" of the package which is particularly efficient to change the gas atmosphere in the package and/or to change its shape.

According to another inventive or preferred embodiment of the present invention, in the film tube and/or in the form- and/or fill-tube a modified atmosphere or negative pressure is provided, wherein the packaging machine comprises a sensor, which analyzes at least one component of the gas phase in the film tube and/or in the form- and/or fill-tube and which is located in the vicinity of the downstream end of the form- and/or fill tube and/or upstream from the cross sealing means and/or in the vicinity of the outlet of the gas that modifies the atmosphere.

The disclosure made regarding this embodiment of the present invention also applies to the other embodiments of the present invention and vice versa. Subject matters of this embodiment can be combined with other embodiments and vice versa.

According to this embodiment of the present invention, in the film tube and/or in the form- and/or fill-tube a modified atmosphere or negative pressure is provided. This is preferably done by introducing a gas or another substance which is different in comparison to air into the film tube and/or in the form- and/or fill-tube. Inventively, the packaging machine comprises a sensor, which analyzes at least one component of the gas phase in the film tube and/or in the form- and/or fill-tube and which is located in the vicinity of the downstream end of the form- and/or fill tube and/or upstream from the cross sealing means and/or in the vicinity of the outlet of the gas that modifies the atmosphere. Due to the location of the sensor, control- and/or start-up-processes can be speed up. No gas line is needed to suck the gas out of the form- and/or fill-tube. Furthermore the consumption of gas or the like can be reduced. The gas atmosphere in the package can be controlled perfectly.

According to jet another inventive or preferred embodiment of the present invention, the packaging machine comprises means to apply a sensor spot to the film.

The disclosure made regarding this embodiment of the present invention also applies to the other embodiments of the present invention and vice versa. Subject matters of this embodiment can be combined with other embodiments and vice versa.

A sensor spot preferably comprises a substance whose physical- and/or chemical properties change with the concentration of a gas component, preferably oxygen, that gets in contact with the substance. For example, the frequency and/or the wavelength and/or the phase of a electromagnetic radiation changes reversibly with the concentration of a gas component. This change can be determined with a detector, which is preferably also part of the inventive packaging machine. The sensor spot is preferably elongated in the direction of the movement of the film. Preferably, the sensor sport has the shape of a strip. Preferably, the sensor sport is provided as a fluid which is applied to the film, preferably dropped or sprayed on the film. Preferably the liquid of the sensor spot comprises a solvent, which evaporates so that the sensor spot material solidifies on the film and/or which etches the film temporarily and then solidifies again and thereby attaches the sensor spot material to the film. The sensor spot is applied such that it is on the inner side of the material after it has been formed into a tube.

The sensor spot is preferably applied while the film is still planar and/or while the film is moving. Preferably, the sensor spot is applied so well upstream from the form- and/or fill-tube that a solvent is at least essentially evaporated before the film is formed into a tube. Preferably, the sensor spot is applied after the film has passed the last roll, which get in contact with the side of the film on which the sensor spot is applied.

Preferably, the sensor spot is analyzed while the film and hence the sensor spot is moving.

Preferably each package comprises a sensor spot.

According to yet another inventive or preferred embodiment of the present invention, the flow wrapper comprises at least one detector which analyses at least one component of the gas atmosphere in the closed package.

The disclosure made regarding this embodiment of the present invention also applies to the other embodiments of the present invention and vice versa. Subject matters of this embodiment can be combined with other embodiments and vice versa.

The detector preferably analyses a sensor spot as described above.

Preferably the detector comprises a light source, more preferably a laser light source.

The detector is preferably calibrated such that the influence of the film on the measurement of the gas component is eliminated, particularly if the radiation emitted by a sensor spot or by the gas phase inside the package itself is analyzed.

According to another inventive or preferred embodiment of the present invention, the inventive flow wrapper comprises at least one temperature sensor which measure(s) the temperature of the film and/or the sensor-pot and/or the temperature of the atmosphere inside the package and/or the temperature of the packaged product. This measurement is preferably utilized to compensate influence of the temperature on the measurement of the concentration of the gas component inside the package.

According to another inventive or preferred embodiment of the present invention, the inventive flow wrapper comprises at least one temperature sensor which measure(s) the temperature of the film and/or the sensor-pot and/or the temperature of the atmosphere inside the package and/or the temperature of the packaged product. This measurement is preferably utilized to compensate influence of the temperature on the measurement of the concentration of the gas component inside the package.

The disclosure made regarding this embodiment of the present invention also applies to the other embodiments of the present invention and vice versa. Subject matters of this embodiment can be combined with other embodiments and vice versa.

According to another inventive or preferred embodiment of the present invention, the inventive flow wrapper comprises at least one pressure sensor which measure(s) the inside the package. This measurement is preferably utilized to compensate influence of the pressure on the measurement of the concentration of the gas component inside the package.

The disclosure made regarding this embodiment of the present invention also applies to the other embodiments of the present invention and vice versa. Subject matters of this embodiment can be combined with other embodiments and vice versa.

Another embodiment of the present invention is a method to produce a package from a planar film, which has been formed into a film tube to which a longitudinal seal and at least one cross seal has been applied, so that the package is hermetically closed, wherein at least one component of the atmosphere in the package is analyzed.

The disclosure made regarding this embodiment of the present invention also applies to the other embodiments of the present invention and vice versa. Subject matters of this embodiment can be combined with other embodiments and vice versa.

This embodiment of the present invention relates to a method to produce a package with a flow wrapper. A planar film is transported continuously or intermittently and thereby formed in to a tube. The two opposing ends of the film are sealed together with a longitudinal seal. The film is then fill with the item(s) to be packaged and then a cross seal is provided to close the package hermetically. Finally the package is separated from the film tube.

According to the invention, at least one component of the gas phase in the package is analyzed, preferably inline and without destroying the package. The analysis can take place several time, downstream from the cross sealing means. Preferably the package moves while it is analyzed.

The analysis is preferably carried out by analyzing the electromagnetic radiation emitted by a sensor spot inside the package and/or by the gas in the package itself.

Preferably, the pressure inside the package is changed after its production, i.e. after the cross seal has been applied. Due to this pressure change, the gas atmosphere in the package changes, in case one of the seals is not air-tight and in case the composition inside the package and outside the package is different. This change can be surveyed by a detector, which surveys at least one component of the gas phase is analyzed during or after the pressure change.

Yet another embodiment of the present invention is a method, wherein the film is provided around a form- and/or fill-tube and that a gas is introduced into the form- and/or fill tube and wherein at least one component of the gas is analyzed in the vicinity of the downstream end of the form- and/or fill tube and/or upstream from the cross sealing means and/or in the vicinity of the outlet of the gas that modifies the atmosphere and/or in the film tube prior to the application of the cross seal.

The disclosure made regarding this embodiment of the present invention also applies to the other embodiments of the present invention and vice versa. Subject matters of this embodiment can be combined with other embodiments and vice versa.

According to this embodiment of the present invention, in the film tube and/or in the form- and/or fill-tube a modified atmosphere or negative pressure is provided. This is preferably done by introducing a gas or another substance which different in comparison to air into the film tube and/or in the form- and/or fill-tube. Inventively, the packaging machine comprises a sensor, which analyzes at least one component of the gas phase in the film tube and/or in the form- and/or fill-tube and which is located in the vicinity of the downstream end of the form- and/or fill tube and/or upstream from the cross sealing means and/or in the vicinity of the outlet of the gas that modifies the atmosphere. Due to the location of the sensor, control- and/or start-up-processes can be speed up. Furthermore the consumption of gas or the like can be reduced. The atmosphere in the package can be controlled perfectly.

The invention is now explained according to FIGS. 1-3. These explanations do not limit the scope of protection. The explanations apply to all embodiments of the present invention likewise.

Figure 1:
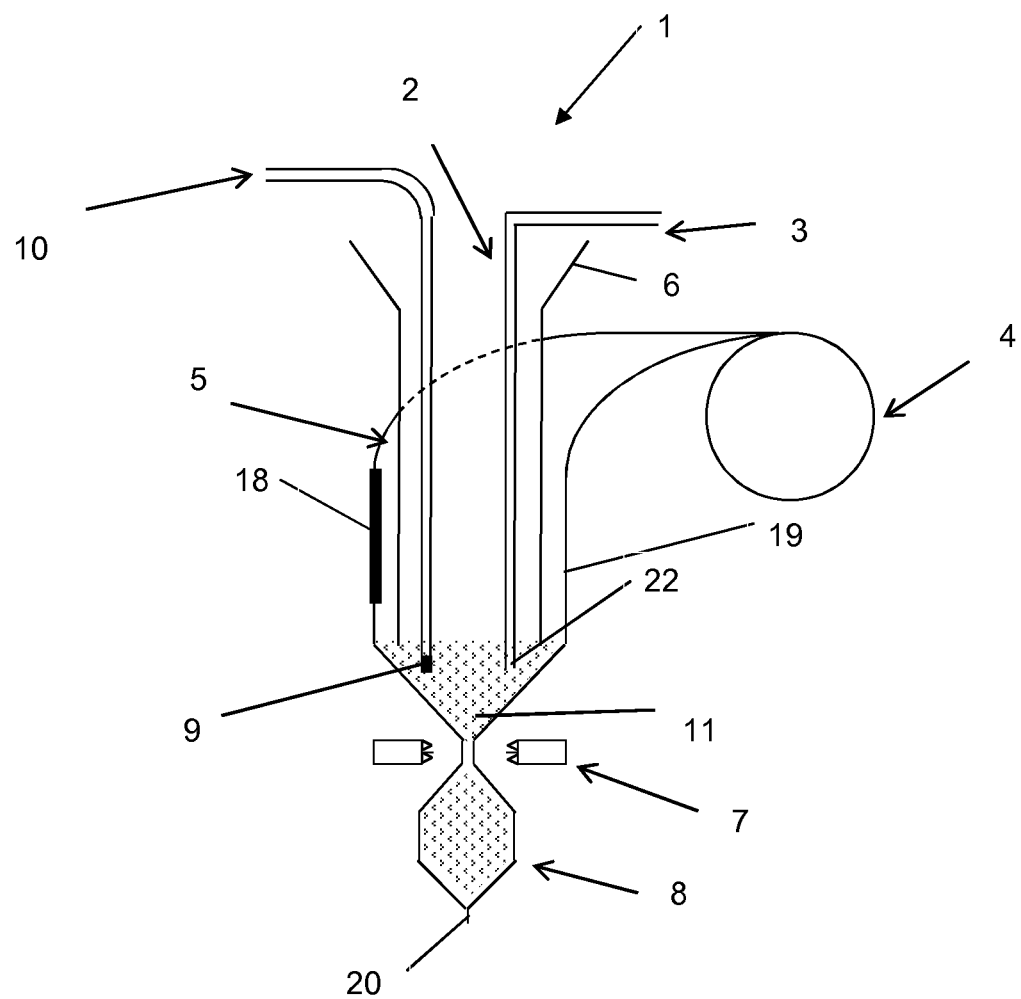
FIG. 1 shows an embodiment of a sensor located downstream from the form- and/or fill-tube.

FIG. 1 shows a first embodiment of the inventive flow wrapper 1, in the present case a so called vertical flow wrapper. This flow wrapper comprises a form- and/or fill-tube 5 with a form shoulder 6. A continuous or intermittently transported, initially planar film 4 is formed by the form shoulder into a film tube 19 which extends around the form- and/or fill-tube. The two opposing ends of the film 4 are sealed together by longitudinal sealing means 18. Downstream, relative to the transportation direction of the film tube 19, cross seal means 7 are arranged which provide a cross seal 20 to the film tube 19. The fill tube 5 is utilized to insert the items to be packaged into the film tube. In the present case this filling is carried out under a modified atmosphere by providing for example $N_2$ and/or $CO_2$ into the form- and/or fill tube and/or into the film tube here via a gas-lance 2 which is connected to a gas source. The gas flows out of the downstream end of the lance 2 and into the film tube. After the film tube is filled with the packaging item and the gas atmosphere is sufficiently modified, a cross seal 20 is supplied at the upstream end of the package to close it hermetically and the so finalized package 8 is cut off from the film tube 19. In the film tube 19, downstream from the form- and/or fill-tube 5, but upstream from the cross seal means 7, here essentially at the same vertical extension as the outlet of the gas-lance, a sensor/detector 9 is provided which analyzes the concentration of at least one component of the gas phase in the film tube. A sensor spot is for example illuminated by a light source, for example a LED and based on the concentration of the respective substance, the light emitted by the sensor spot changes. The sensor/detector 9 provides a signal via line 10 to the control of the flow wrapper, which hence knows the concentration of at least one component in the film tube. The signal can be used to control the amount of gas supplied by the gas source 3. The signal can also be used to control the transportation of the film tube 19 and/or the cross seal means 7 and/or the supply of the packaging item. Only in case the gas concentration is correct, the production of packages will be carried out, i.e. the film will be transported and/or the film tube will be filled with the packaging item and/or a cross seal will be applied.

Figure 2:
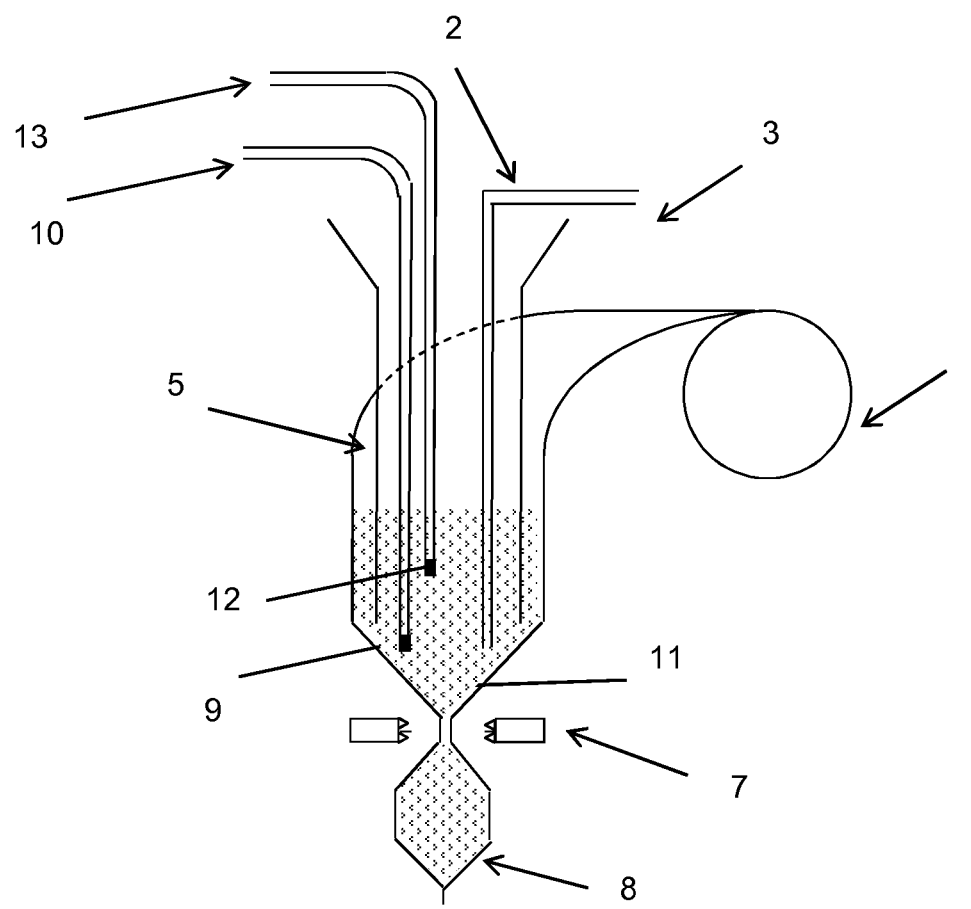
FIG. 2 shows an embodiment with two sensors.

FIG. 2 shows a modification of the embodiment according to FIG. 1, so that reference can be made to the disclosure regarding FIG. 1. In the present case, the inventive flow wrapper comprises additionally a second sensor 12 which is located upstream from the first sensor/detector 9 relative to the direction of flow of the film material 4 and/or the direction of the movement of the packaging item which drops through the fill-tube 5 from the top to the bottom by gravity. Preferably the second sensor is located inside the form- and/or fill-tube. The second sensor can be identically built as the sensor/detector 9 and is preferably also connected to the control of the flow wrapper and can be utilized to control the flow wrapper. If even the sensor/detector 12 reads the desired concentration of the gas component, it is even more assured that the gas concentration in the package is correct. By positioning the sensor/detector 12 in an appropriate position in the appropriate position, it can be assured that the form- and/or fill-tube is always filled sufficiently with modified gas, for example by controlling the gas supply with the signal of sensor/detector 12.

Figure 3:
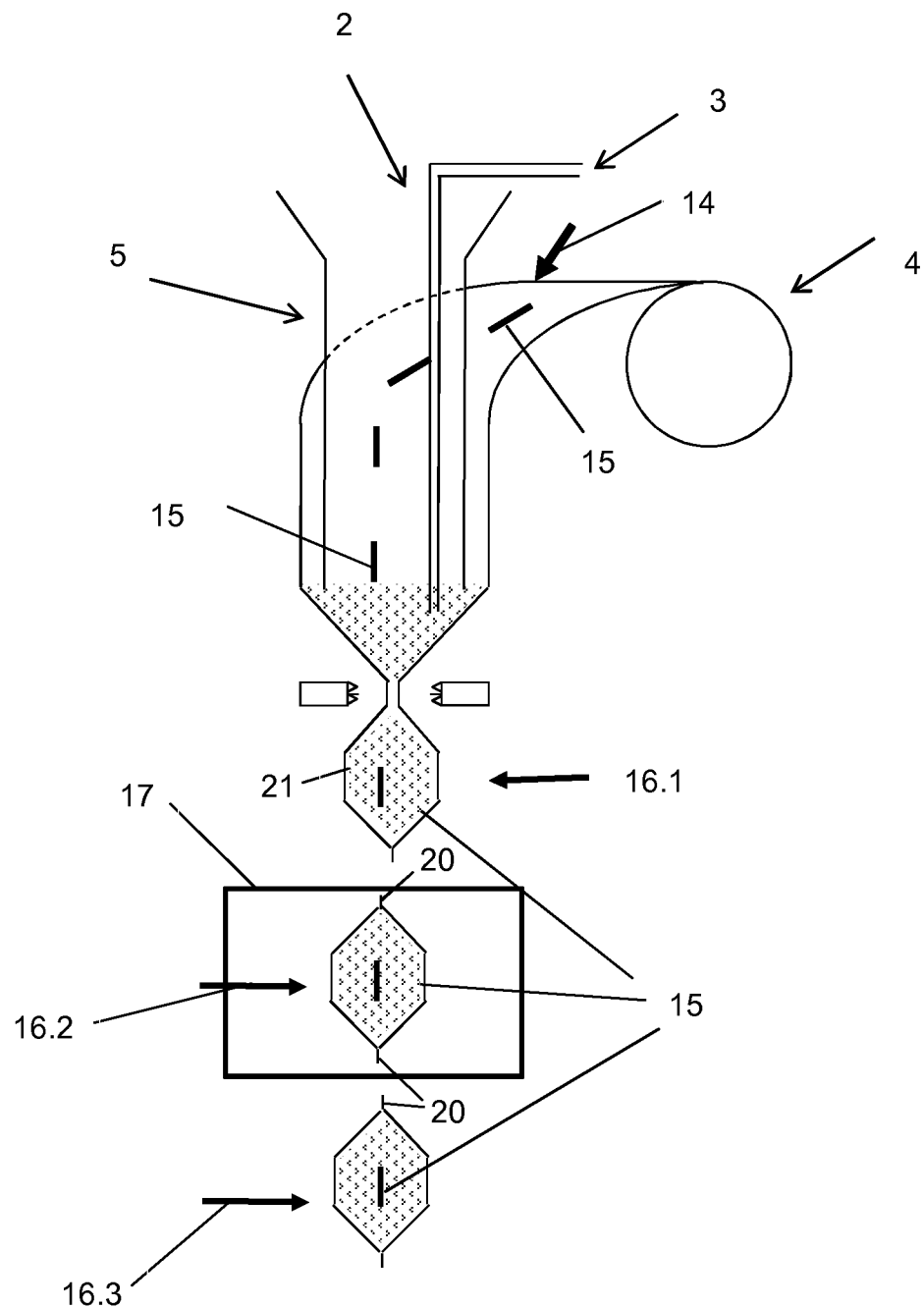
FIG. 3 shows the sealing tool.

Reference is now made to FIG. 3. The flow wrapper is essentially described according to FIG. 1. The sensor 9 is not depicted but can be present. In this embodiment, the flow wrapper comprises an application device 14, here a printer, which applies a sensor spot 15 to the film, preferably the planar film, such that inside every package 18 a sensor spot is provided. The sensor spot is sensitive to the concentration of at least one component of the gas phase in the package. The inventive flow wrapper may comprise one or more detectors 16, which each read out a signal, for example a colour change, of the sensor spot, when the packages passes by, preferably while the package is moving. With the detector 16.1 it can be determined whether the atmosphere in the package is correct prior to closing or to sort it out in case the concentration is not correct. The sensor 16.2 is located inside or in the vicinity of a pressure chamber 17, which changes the pressure inside the package in case one of the seals 20, 21 is not perfectly gas tight. In the pressure chamber the pressure around the package can be increased or decreased and/or the pressure inside the package can be increased or decreased. In case of a modified atmosphere inside the package, air can be pressed inside the package, which changes the concentration of the gas component to be surveyed. This is realized by sensor 16.2 which measures the change in the signal, for example the electromagnetic waves emitted by the sensor spot 15 and knows that the seals 20, 21 are not perfect. The change in the signal from the sensor spot can also be recognized by comparing the readings of sensors 16.1 and 16.3. In case they differ, the concentration in the gas atmosphere has changed over time and/or due to the pressure chamber and it can be concluded that the respective package is not tight.

LIST OF REFERENCE SIGNS 1 packaging machine, flow wrapper
2 gas supply, gas-lance
3 gas source
4 film
5 form- and/or fill-tube
6 form-shoulder
7 cross seal, cutting means
8 package
9 first sensor
10 first connection of the first sensor with the control of the machine
11 modified atmosphere in the film tube 19 and/or in the package 8
12 second sensor
13 second connection of the first sensor with the control of the machine
14 application device for sensor spot, printer
15 sensor spot
16 detector
17 pressure means
18 longitudinal sealing means
19 film tube
20 cross-seal
21 longitudinal seal
22 outlet of the gas that modifies the atmosphere

The invention claimed is:
1. A flow wrapper comprising:
a form-and/or-fill tube, which forms a planar film into a film tube and/or fills the film tube with a packaging item to produce a package,
means to provide a longitudinal seal and/or a cross seal to the film tube, and
means to detect leaks at the longitudinal seal and/or the cross seal,
wherein a modified atmosphere or negative pressure is provided in the film tube and/or in the form-and/or-fill tube,
wherein the flow wrapper comprises a first sensor that is located in a vicinity of a downstream end of the form-and/or-fill tube and/or upstream from a cross sealing means and/or in a vicinity of a gas outlet that modifies the atmosphere in the film tube and/or in the form-and/or-fill tube, and wherein the flow wrapper comprises a second sensor located upstream from the first sensor, the second sensor analyzes at least one component of the atmosphere in the film tube and/or in the form-and/or-fill tube.

2. The flow wrapper according to claim 1, wherein the first sensor is located in the film tube and is downstream from the downstream end of the form-and/or-fill tube.

3. The flow wrapper according to claim 2, wherein the first sensor is upstream from the cross sealing means.

4. The flow wrapper according to claim 3, wherein the first sensor is located at a same vertical extension as the gas outlet.

5. The flow wrapper according to claim 4, wherein the first sensor is enabled to provide a signal to control an amount of gas supplied by a gas source.

6. The flow wrapper according to claim 4, wherein the first sensor is enabled to provide a signal to control transportation of the film tube and/or the cross sealing means.

7. The flow wrapper according to claim 1, wherein the flow wrapper comprises means to apply a sensor spot to the film.

8. The flow wrapper according to claim 7, wherein the sensor spot comprises a substance whose physical-and/or-chemical properties change when the atmosphere contacts the the substance.

9. The flow wrapper according to claim 8, wherein the sensor spot is elongated in a direction of movement of the film tube.

10. The flow wrapper according to claim 1, wherein the flow wrapper comprises means to change an internal pressure of the package after production of the package.

11. The flow wrapper according to claim 1, wherein the flow wrapper comprises at least one detector, which analyses at least one component of a gas atmosphere in a sealed package.

12. A method to produce a package from a planar film, which is formed into a film tube to which a longitudinal seal and at least one cross seal are applied so that the package is hermetically closed, wherein the film is provided around a form-and/or-fill tube, wherein at least one component of a gas in the package is analyzed by a first sensor and a second sensor that are in a vicinity of a downstream end of the form-and/or-fill tube and/or upstream from a cross sealing means and/or in a vicinity of a gas outlet that modifies atmosphere in the form-and/or-fill tube and/or in the film tube prior to application of the cross seal, and wherein the second sensor is provided upstream from the first sensor, and gas supply from the gas outlet is controlled by both the first sensor and the second sensor.

13. The method according to claim 12, wherein the first sensor is located in the film tube and is downstream from the downstream end of the form-and/or-fill tube.

14. The method according to claim 13, wherein the first sensor is upstream from the cross sealing means.

15. The method according to claim 14, wherein the first sensor is located at a same vertical extension as the gas outlet.

16. The method according to claim 15, wherein the method comprises controlling a transportation of the film tube and/or of the cross seal means via a signal from the first sensor.

17. The method according to claim 12, wherein the film is provided around a form-and/or-fill tube, and a gas is introduced into the form-and/or-fill tube, wherein at least one component of the gas is analyzed in a vicinity of a downstream end of the form-and/or-fill tube and/or upstream from a cross sealing means and/or in a vicinity of an outlet of a gas that modifies the atmosphere in the film tube prior to application of the at least one cross seal.

18. The method according to claim 12, wherein the method comprises applying a sensor spot to the film tube, the sensor spot is provided as a fluid and applied to the film tube, and wherein the sensor spot is applied on an inner side of the film tube.

19. The method according to claim 12, wherein pressure inside the package is changed after production of the package.

20. The method according to claim 12, wherein the at least one component of the atmosphere is analyzed during or after a pressure change.

* * * * *